(12) United States Patent
McFarland et al.

(10) Patent No.: US 6,701,849 B2
(45) Date of Patent: Mar. 9, 2004

(54) DUAL STAGE AIR BAG INFLATOR WITH SECONDARY PROPELLANT CAP

(75) Inventors: Eric R. McFarland, Mesa, AZ (US); Darin P. Mika, Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/829,696

(22) Filed: Apr. 10, 2001

(65) Prior Publication Data

US 2002/0144621 A1 Oct. 10, 2002

Related U.S. Application Data

(63) Continuation of application No. 09/264,163, filed on Mar. 5, 1999, now abandoned.

(51) Int. Cl.⁷ .............................................. B60R 21/26
(52) U.S. Cl. ........................ 102/530; 280/741; 102/531
(58) Field of Search ................................ 102/530, 531; 280/736, 741, 742

(56) References Cited

U.S. PATENT DOCUMENTS

| 3,972,545 A | 8/1976 | Kirchoff et al. ............ 280/741 |
| 3,986,456 A | 10/1976 | Doin et al. .................. 102/530 |

(List continued on next page.)

FOREIGN PATENT DOCUMENTS

| DE | 2224201 | 11/1973 |
| DE | 4000309 | 7/1991 |
| DE | 4019677 | 1/1992 |
| DE | 19531667 | 10/1996 |
| DE | 19611102 | 9/1997 |
| DE | 19620758 | 11/1997 |
| DE | 19709257 | 9/1998 |
| DE | 19757478 | 6/1999 |
| EP | 0709262 | 5/1996 |
| EP | 0738631 | 10/1996 |
| EP | 0773145 | 5/1997 |
| EP | 0844147 | 5/1998 |
| EP | 0870651 | 10/1998 |
| EP | 0879739 | 11/1998 |
| EP | 0901946 | 3/1999 |
| EP | 1074433 | 2/2001 |
| JP | 10119705 | 3/1998 |
| JP | 11189124 | 7/1999 |
| WO | 9425315 | 11/1994 |

OTHER PUBLICATIONS

TRW Presentation to General Motors, Dec. 8, 1997.
TRW Presentation to Chrysler, Jan. 28, 1997.

*Primary Examiner*—Harold J. Tudor
(74) *Attorney, Agent, or Firm*—Tarolli, Sundheim, Covell & Tummino L.L.P.

(57) ABSTRACT

An inflator (10) for inflating an inflatable device includes a housing (20). A primary propellant (240) in a primary chamber (200) in the housing (20) is ignitable to provide inflation fluid to inflate the inflatable device. A secondary propellant (250) in a secondary chamber (180) in the housing (20) is ignitable to provide inflation fluid to inflate the inflatable device. The inflator (10) includes initiator means (130, 154) for selectively igniting either the primary propellant (240) alone or both of the primary and secondary propellants (240, 250). The inflator (10) also includes a secondary propellant cap (260) for closing the secondary chamber (180) and for maintaining the secondary propellant (250) in the secondary chamber. The secondary propellant cap (260) has a first position blocking flow of combustion products of the first propellant (240) into the secondary chamber (180) when only the primary propellant is ignited. The secondary propellant cap (260) is movable by combustion products of the secondary propellant (250) when ignited from the first position to a second position enabling flow of inflation fluid out of the secondary chamber (180) to inflate the inflatable device.

21 Claims, 6 Drawing Sheets

U.S. PATENT DOCUMENTS

| | | | |
|---|---|---|---|
| 4,950,458 A | 8/1990 | Cunningham | 102/530 |
| 4,998,751 A | 3/1991 | Paxton et al. | 280/741 |
| 5,033,390 A | 7/1991 | Minert et al. | 102/530 |
| 5,551,724 A | 9/1996 | Armstrong, III et al. | 280/741 |
| 5,564,743 A | 10/1996 | Marchant | 280/741 |
| 5,628,528 A | 5/1997 | DeSautelle et al. | 280/741 |
| 5,630,619 A | 5/1997 | Buchanan et al. | 280/741 |
| 5,799,973 A | 9/1998 | Bauer et al. | 280/741 |
| 5,803,494 A | 9/1998 | Headley | 280/741 |
| 5,851,027 A | 12/1998 | DiGiacomo et al. | 280/736 |
| 5,934,705 A | 8/1999 | Siddiqui et al. | 280/741 |
| 5,951,040 A | 9/1999 | McFarland et al. | 280/736 |
| 5,970,880 A | 10/1999 | Perotto | 102/531 |
| 5,984,352 A | 11/1999 | Green, Jr. et al. | 280/736 |
| 6,019,389 A | 2/2000 | Burgi et al. | 280/736 |
| 6,032,979 A | 3/2000 | Mossi et al. | 280/741 |
| 6,068,291 A | 5/2000 | Lebaudy et al. | 280/736 |
| 6,089,598 A | 7/2000 | Snyder et al. | 280/740 |
| 6,116,641 A | 9/2000 | Scheffee | 280/736 |
| 6,299,203 B1 | 10/2001 | Muller | 280/736 |
| 6,364,353 B2 * | 4/2002 | Green, Jr. et al. | 280/736 |
| 6,406,053 B1 | 6/2002 | Bayer et al. | 102/530 |

* cited by examiner

DUAL STAGE AIR BAG INFLATOR WITH SECONDARY PROPELLANT CAP

This application is a continuation of application Ser. No. 09/264,163, filed Mar. 5, 1999 and which is now abandoned.

BACKGROUND OF THE INVENTION

1. Technical Field

The present invention relates to an apparatus for inflating an inflatable vehicle occupant protection device.

2. Description of the Prior Art

An inflatable vehicle occupant protection device, such as an air bag, is deployed upon the occurrence of a vehicle crash. The air bag is part of a vehicle occupant protection apparatus which further includes a crash sensor and an inflator. The inflator includes a housing and an inflation fluid source, such as a solid propellant, in the housing. When the crash sensor senses a crash-indicating condition of at least a predetermined threshold level, the inflator is actuated and produces inflation fluid under pressure in the inflator housing. The pressurized inflation fluid is directed out of the inflator housing and inflates the air bag into the vehicle occupant compartment. When the air bag is deployed in this manner, it helps to protect an occupant of the vehicle from a forceful impact with parts of the vehicle as a result of the crash.

When the inflator is actuated at an elevated ambient temperature, the pressure of the inflation fluid in the inflator housing increases. An inflator must be strong enough structurally to contain these elevated pressures. If the pressure in the inflator housing is thus increased, the mass flow rate of the inflation fluid flowing into the air bag can increase above the desired flow rate. Also, the possibility of such increased pressures may make it unfeasible to use a solid propellant which has a high burn rate exponent, that is, a high sensitivity to pressure variation.

SUMMARY OF THE INVENTION

The present invention is an inflator for providing inflation fluid for inflating an inflatable vehicle occupant protection device. The inflator comprises a housing. A primary propellant in a primary chamber in the housing is ignitable to provide inflation fluid to inflate the inflatable device. A secondary propellant in a secondary chamber in the housing is ignitable to provide inflation fluid to inflate the inflatable device. The inflator includes initiator means for selectively igniting either the primary propellant alone or both of the primary and secondary propellants. The inflator also includes a secondary propellant cap for closing the secondary chamber and for maintaining the secondary propellant in the secondary chamber. The secondary propellant cap has a first position blocking flow of combustion products of the first propellant into the secondary chamber when only the primary propellant is ignited. The secondary propellant cap is movable by combustion products of the secondary propellant when ignited from the first position to a second position enabling flow of inflation fluid out of the secondary chamber to inflate the inflatable device.

BRIEF DESCRIPTION OF THE DRAWINGS

Further features of the present invention will become apparent to those skilled in the art to which the present invention relates from reading the following description with reference to the accompanying drawings, in which.

DESCRIPTION OF A PREFERRED EMBODIMENT

Figure 1:
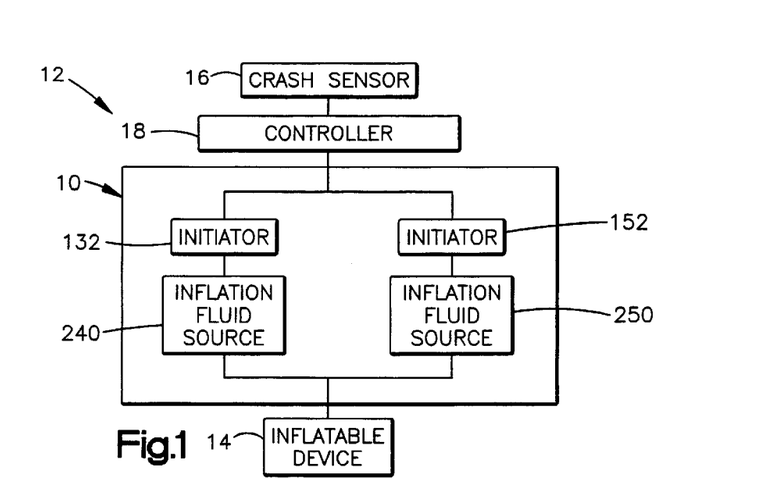
FIG. 1 is a schematic view of a vehicle occupant protection apparatus including an inflator constructed in accordance with a first embodiment of the present invention.

The present invention relates to an apparatus for providing inflation fluid for inflating an inflatable vehicle occupant protection device. As representative of the present invention, FIG. 1 illustrates schematically an inflator 10 which forms part of a vehicle occupant protection apparatus 12.

The apparatus 12 includes an inflatable vehicle occupant protection device 14. In the preferred embodiment of the invention, the protection device 14 is an air bag for helping to protect a driver of a vehicle. Other inflatable vehicle occupant protection devices that can be used in accordance with the present invention include, for example, inflatable seat belts, inflatable knee bolsters, inflatable head liners or side curtains, and knee bolsters operated by inflatable air bags.

The inflator 10 is electrically actuatable to provide inflation fluid for inflating the air bag 14. When the air bag 14 is inflated, it extends into a vehicle occupant compartment (not shown) to help protect a vehicle occupant from a forceful impact with parts of the vehicle, such as the vehicle steering wheel, as a result of a crash.

The apparatus 12 also includes a crash sensor 16. The crash sensor 16 is a known device which senses a vehicle condition that indicates the occurrence of a crash. If the vehicle condition sensed by the crash sensor 16 is at or above a first predetermined threshold level, it indicates the occurrence of a crash having a first predetermined threshold level of severity. The first threshold level of crash severity is a level at which inflation of the air bag 14 at a relatively low rate is desired for protection of a vehicle occupant. If the vehicle condition sensed by the crash sensor 16 is at or above a second predetermined threshold level, it indicates the occurrence of a crash having a second, higher, predetermined threshold level of severity. The second threshold level of crash severity is a level at which inflation of the air bag 14 at a relatively high rate is desired for protection of a vehicle occupant.

The vehicle condition sensed by the crash sensor 16 preferably is sudden vehicle deceleration that is caused by a collision. The magnitude and duration of the deceleration are measured by the crash sensor 16. If the magnitude and duration of the deceleration meet or exceed predetermined threshold levels, they indicate the occurrence of a crash that meets or exceeds the predetermined threshold levels of crash severity. A suitable deployment signal is then transmitted to a controller 18 to indicate the occurrence of such a crash. The controller 18 sends an actuation signal to the inflator 10 to actuate the inflator.

Figure 2:
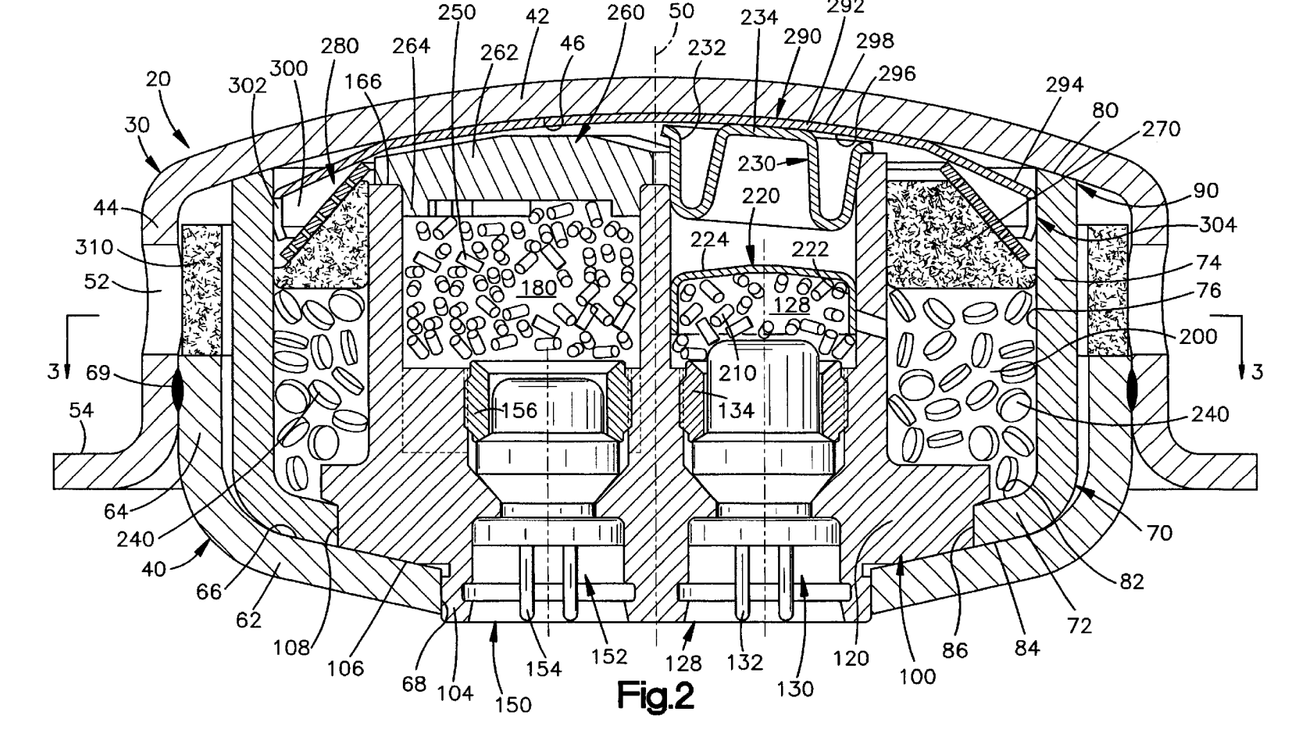
FIG. 2 is an axial sectional view showing the inflator of FIG. 1 in an unactuated condition.
Figure 3:
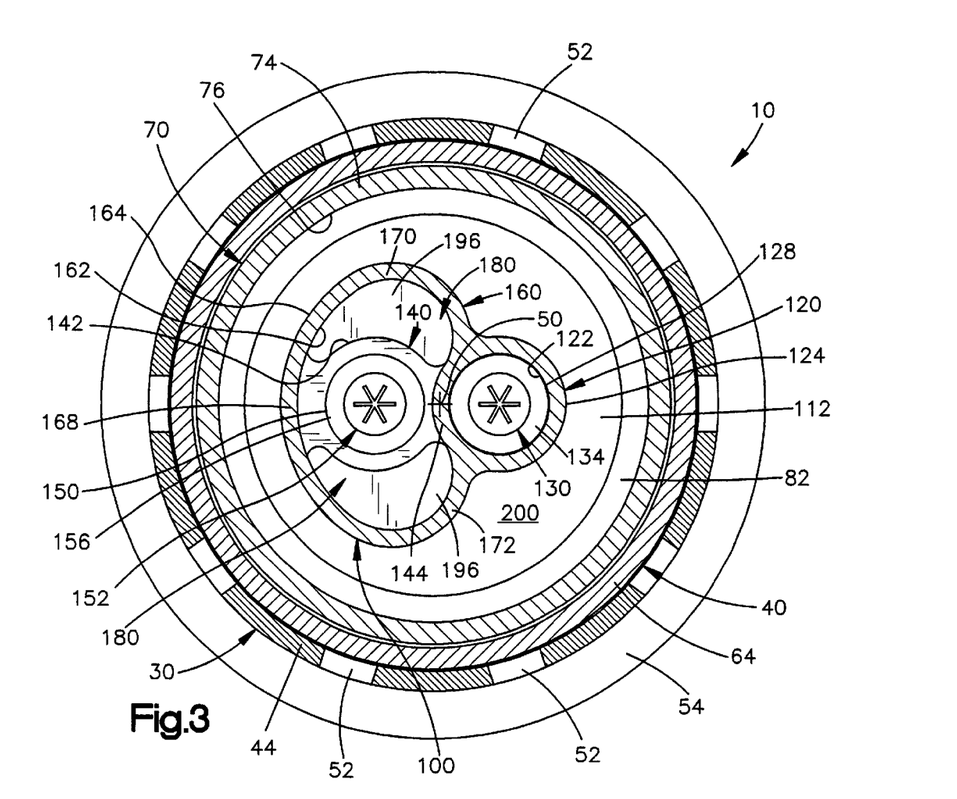
FIG. 3 is a radial sectional view showing the inflator of FIG. 1 in an unactuated condition.

The inflator 10 (FIGS. 2–4) includes a generally cylindrical housing or shell 20. The inflator 10 has a circular configuration as viewed from above in FIG. 2 (as shown in FIG. 3). The housing 20 includes a first or upper (as viewed in FIG. 2) housing part 30, referred to herein as a diffuser, and a second or lower (as viewed in FIG. 2) housing part 40, referred to herein as a closure.

The diffuser 30 has an inverted, cup-shaped configuration centered on an axis 50 of the inflator 10. The diffuser 30 includes a radially extending end wall 42 and an axially extending side wall 44. The end wall 42 of the diffuser 30 is domed, that is, has a curved configuration projecting away from the closure 40. The end wall 42 has an inner side surface 46.

The side wall 44 of the upper housing part 30 has a cylindrical configuration centered on the axis 50. A plurality of inflation fluid outlets 52 are disposed in a circular array on the side wall 44. Each one of the inflation fluid outlets 52 extends radially through the side wall 44. The outlets 52 enable flow of inflation fluid out of the inflator 10 to inflate the air bag 14. The outlets 52, as a group, have a fixed, predetermined flow area. An annular inflator mounting flange 54 extends radially outward from the side wall 44 at a location below (as viewed in FIG. 2) the inflation fluid outlets 52.

The closure 40 has a cup-shaped configuration including a radially extending end wall 62 and an axially extending side wall 64. The end wall 62 of the closure 40 is domed, that is, has a curved configuration projecting away from the upper housing part 30. The end wall 62 has an inner side surface 66 presented toward the end wall 42 of the upper housing part 30. A circular opening 68 in the end wall 62 is centered on the axis 50.

The side wall 64 of the closure 40 has a cylindrical configuration centered on the axis 50. The outer diameter of the side wall 64 of the closure 40 is approximately equal to the inner diameter of the side wall 44 of the diffuser 30. The closure 40 is nested inside the upper housing part 30, as seen in FIG. 2. The side wall 64 of the closure 40 is welded to the side wall 44 of the upper housing part 30 with a single, continuous weld 69.

The inflator 10 includes a first flow control member in the form of a combustor or combustion cup 70. The combustion cup 70 has an annular configuration including a radially extending lower end wall 72 and an axially extending side wall 74. The side wall 74 has an inner side surface 76.

The side wall 74 of the combustion cup 70 is disposed radially inward of the side walls 44 and 64 of the diffuser 30 and closure 40, respectively. The side wall 74 has a ring-shaped upper end surface 80. The upper end surface 80 has a generally frustoconical configuration which seals against the inner side surface 46 of the end wall 42 of the upper housing part 30.

The upper end surface 80 of the combustion cup side wall 74 and the inner side surface 46 of the upper housing part 30 define a fluid passage 90 (FIGS. 2, 5 and 6) in the inflator 10. Because the combustion cup side wall 74 is cylindrical, the fluid passage 90 has an annular configuration extending around and centered on the axis 50. The fluid passage 90 is located near the fluid outlets 52. The fluid passage 90, which is normally closed, opens upon actuation of the inflator 10 as described below.

The lower end wall 72 of the combustion cup 70 extends radially inward from the lower portion of the side wall 74 of the combustion cup. The lower end wall 72 has an inner side surface 82 which is presented toward the upper housing part 30. The lower end wall 72 has an outer side surface 84 which is in abutting engagement with the inner side surface 66 of the end wall 62 of the closure 40. The axial length of the combustion cup 70 is selected so that the combustion cup is trapped or captured axially between the upper housing part 30 and the closure 40. The lower end wall 72 of the combustion cup 70 also has a ring-shaped end surface 86.

Figure 4:
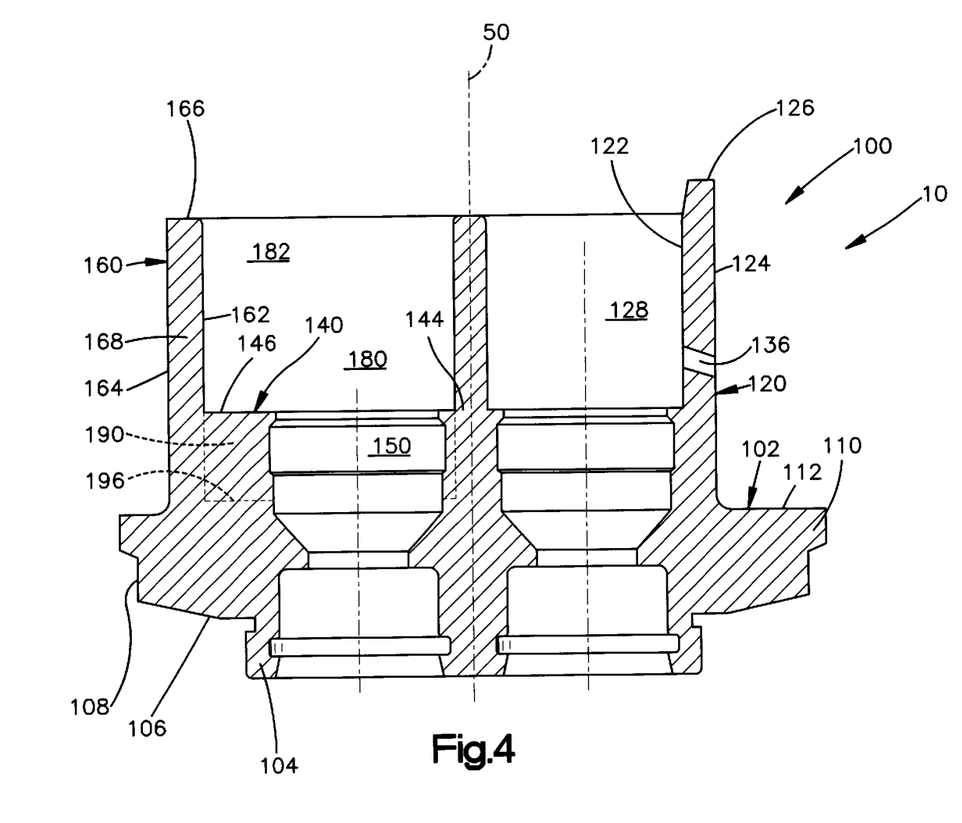
FIG. 4 is a sectional view of an igniter housing which forms a part of the inflator of FIG. 1.

The inflator 10 includes an igniter housing 100 (FIGS. 3 and 4). The igniter housing 100 is located centrally in the inflator 10. The igniter housing 100 includes a mounting portion 102, a primary initiator wall 120, a secondary initiator wall 140, and a secondary propellant chamber wall 160.

The mounting portion 102 of the igniter housing 100 is disposed at the lower end (as viewed in FIG. 4) of the igniter housing 100. A cylindrical end portion 104 of the mounting portion 102 extends into the circular central opening 68 in the end wall 62 (FIG. 2) of the closure 40. Above the end portion 104, the mounting portion 102 has a radially extending lower side surface 106 which is in engagement with the inner major side surface 66 of the closure 40.

The mounting portion 102 has a cylindrical outer side surface 108 that extends upward from the lower side surface 106 and that is in engagement with the cylindrical end surface 86 on the combustion cup 70. A flange 110 of the mounting portion 102 projects radially outward from the upper end of the side surface 108 and overlies the inner major side surface 82 of the combustion cup 70. A radially extending upper major side surface 112 of the mounting portion 102 extends onto the flange 110, The end surface 86 of the combustion cup 70 is disposed adjacent to and underlies the flange 110 of the igniter housing 100. The igniter housing 100 helps to locate the combustion cup 70 radially in the inflator 10.

The primary initiator wall 120 of the igniter housing 100 projects axially from the upper side surface 112 of the mounting portion 102. The wall 120 has a cylindrical configuration including parallel, axially extending inner and outer side surfaces 122 and 124. The wall 120 has a radially extending upper end surface 126. The wall 120 is not centered on the axis 50. The axis 50 extends through the wall 120.

The primary initiator wall 120 defines a primary ignition chamber 128 radially inward of the wall. A primary initiator 130 is mounted in the primary ignition chamber 128. The initiator 130 is a known device which is electrically actuatable by an electric current applied through terminals 132 to generate combustion products. A sleeve 134 is press fit between the primary initiator 130 and the wall 120 to secure the initiator in position in the igniter housing 100. The primary initiator cavity chamber 128 and the primary initiator 130 are disposed at a location in the inflator 10 not centered on the axis 50.

A plurality of ports or passages 136 (FIG. 4) are formed in the primary initiator wall 120, above the primary initiator 130. The passages 136 extend between the primary ignition chamber 128 and the exterior of the igniter housing 100.

The secondary initiator wall 140 (FIGS. 3 and 4) of the igniter housing 100 projects axially from the upper side surface 112 of the mounting portion 102 of the igniter housing 100. The wall 140 has a generally cylindrical configuration extending parallel to the axis 50. The wall 140 has an outer side surface 142 (FIG. 3) and a generally annular upper end surface 146.

The secondary initiator wall 140 has a portion 144 in common with the primary initiator wall 120. The secondary initiator wall 140 is not centered on the axis 50. The inflator axis 50 extends through the common wall portion 144.

The secondary initiator wall 140 defines a secondary ignition chamber 150 radially inward of the wall 140. The center of the secondary ignition chamber 150 and the center of the primary ignition chamber 128 lie on a straight line which extends through the axis 50, as can be seen from FIG. 3.

A secondary initiator 152 is mounted in the secondary ignition chamber 150. The secondary initiator 152 is a known device which is electrically actuatable by an electric current applied through terminals 154 to generate combustion products. A sleeve 156 is press fit between the secondary initiator 152 and the wall 140 to secure the initiator in position in the igniter housing 100.

The secondary propellant chamber wall 160 of the igniter housing 100 extends axially upward from the upper side surface 112 of the mounting portion 102 of the igniter housing. The wall 160 is spaced, throughout most of its circumference, outward from and encloses the secondary initiator wall. The secondary propellant chamber wall 160 has parallel, axially extending inner and outer side surfaces 162 and 164. The wall 160 has a radially extending upper end surface 166.

The secondary propellant chamber wall 160 has a generally kidney-shaped configuration when viewed in plane (from above as viewed in FIG. 2, or as viewed in FIG. 3). The wall 160 includes a cylindrical major portion 168 (FIG. 3) that has a radius of curvature centered on the axis 50 and that is spaced farthest from the axis and closest to the side wall 74 of the combustion cup 70. Two minor portions 170 and 172 of the wall 160 have a smaller radius of curvature than the major portion 168. The minor wall portions 170 and 172 curve inward from the ends of the major wall portion 168 and merge into the primary initiator wall 120.

A secondary propellant chamber 180 is defined inside the secondary propellant chamber wall 160. At a location above (as viewed in FIG. 2) the upper surface 146 of the secondary initiator chamber wall 140, an upper portion 182 of the secondary propellant chamber 180 has a kidney-shaped configuration within the entire extent of the wall 140. The kidney-shaped configuration includes a cylindrical central portion and two lobes which extend outward from the central portion. At a location below the upper surface 146 of the secondary initiator chamber wall 140, a lower portion 190 of the secondary propellant chamber has two parts which lie on opposite sides of the secondary initiator wall 140.

A floor surface 196 (FIG. 3) on the mounting portion 102 of the igniter housing 100 is disposed slightly above (as viewed in FIG. 2) the upper major side surface 112. The floor surface 196 comprises two small kidney-shaped portions disposed inside the secondary chamber wall 160 and outside the secondary initiator wall 140. These two surface portions 196 form the bottom of the secondary propellant chamber 180.

A ring-shaped primary propellant chamber or combustion chamber 200 (FIG. 2) is defined inside the combustion cup 70 and outside the igniter housing 100. The radially outer boundary of the primary propellant chamber 200 is the cylindrical inner side surface 76 of the side wall 74 of the combustion cup 70. The radially inner boundary of the primary propellant chamber 200 is formed by the exterior of the igniter housing 100, including the primary initiator chamber side wall 120 and the secondary initiator chamber side wall 160.

The initiator chamber side walls 120 and 160, together, do not have a cylindrical outer surface, and so the primary propellant chamber 200 does not have a strictly annular configuration. Instead, the radial extent, or width, of the primary propellant chamber 200 is different at different points around the chamber. Specifically, the radial distance between the combustion cup 70 and the igniter housing 100 is smallest along the cylindrical portion 168 of the secondary propellant chamber side wall 160 (to the left as viewed in FIG. 3). The radial distance between the combustion cup 70 and the igniter housing 100 is larger at a diametrically opposite location adjacent the primary initiator chamber side wall 120, and is greatest at the two points in between where the wall 120 meets the wall 160.

A primary ignition material 210 is located in the primary ignition chamber 128, adjacent to and in contact with the primary initiator 130. The primary ignition material 210 is a known material which is ignitable by the primary initiator 130 and which, when ignited, generates combustion products. One suitable material is boron potassium nitrate, or $BKNO_3$. A known autoignition material is mixed in with the primary ignition material 210.

A cup-shaped metal igniter cap 220 is disposed in the primary ignition chamber 128 in the igniter housing 100. The igniter cap 220 contains the primary ignition material 210 in the primary ignition chamber 128. The igniter cap 220 has an axially extending, cylindrical side wall 222 which is press fit inside the primary initiator side wall 120 of the igniter housing 100. The igniter cap 220 also has a radially extending end wall 224.

A metal spring cap 230 closes the upper end of the primary ignition chamber 128 in the igniter housing 100. The spring cap 230 is spaced apart axially from the igniter cap 220, with open space between them. The spring cap 230 has an annular, U-shaped side wall 232 which is press fit inside the primary ignition side wall 120. The spring cap 230 also has a radially extending central wall 234.

The inflator 10 includes a first actuatable inflation fluid source 240 in the form of a solid propellant. The propellant 240 is located in the primary combustion chamber 200, surrounding the igniter housing 100. The propellant 240 is a known material which is ignitable by the combustion products of the primary ignition material 210 and which, when ignited, produces inflation fluid in the form of gas under pressure for inflating the air bag 14. The propellant 240 is illustrated as being provided in the form of a plurality of discs filling or substantially filling the primary propellant chamber 200. The propellant 240 could, alternatively, be provided in the form of small pellets or tablets.

The inflator 10 includes a second actuatable inflation fluid source 250 in the form of a solid propellant. The secondary propellant 250 is located in the secondary propellant chamber 180. The secondary propellant 250 is a known material which is ignitable by the secondary initiator 152 and which, when ignited, produces inflation fluid in the form of gas under pressure for inflating the air bag 14. The secondary propellant 250 may be made from the same material as the primary propellant 240. The secondary propellant 250 is illustrated as being provided in the form of a plurality of small pellets filling or substantially filling the secondary propellant chamber 180. The secondary propellant 250 could, alternatively, be provided in the form of discs or tablets.

A secondary propellant cap 260 closes the upper end of the secondary propellant chamber 180 in the igniter housing 100. The secondary propellant cap 260 has a generally kidney-shaped configuration similar to the configuration of the secondary propellant chamber 180. The secondary propellant cap 260 has a main body portion 262. The main body portion 262 has opposite outer and inner major side surfaces 264 and 266 joined by a curved edge surface 268.

The secondary propellant cap 260 is press fitted in the igniter housing 100. A plurality of locator tabs 269 project from the inner major side surface 266 of the secondary propellant cap 260. The locator tabs 269 are disposed within the secondary propellant chamber 180, in abutting engagement with the inner side surface 162 of the secondary propellant chamber wall 160. The inner major side surface 266 of the secondary propellant cap 260 is in abutting engagement with the radially extending end surface 166 of the secondary propellant chamber wall 160. In this position, the secondary propellant cap 260 blocks fluid flow from outside the secondary propellant chamber 180 into the secondary propellant chamber. The secondary propellant cap 260 also contains the secondary propellant 250 in the secondary propellant chamber 180.

The inflator 10 includes a combustor heat sink 270 in the primary combustion chamber 200. The heat sink 270 has an annular configuration extending around the igniter housing 100. The heat sink 270 is formed as a knitted stainless steel wire tube which is compressed to the generally frustoconical shape illustrated in the drawings.

The inflator 10 also includes a perforated metal heat sink retainer 280 in the primary combustion chamber 180. The heat sink retainer 280 is disposed between the heat sink 270 and the fluid passage 90. The heat sink retainer 280 is preferably formed from expanded metal and has a generally frustoconical configuration fitting over the heat sink 270.

The inflator 10 includes a second fluid flow control member in the form of a threshold cap 290. The threshold cap 290 is disposed radially inward of the combustion cup 70, and is located axially between the igniter housing 100 and the diffuser 30. The threshold cap 290 is made from stamped sheet metal, preferably aluminum, substantially thinner than the housing parts 30 and 40.

The threshold cap 290 (FIG. 2) is shaped generally like a throwing disc and has a domed main body portion or central wall 292 centered on the axis 50. The central wall 292 has a circular configuration including an annular outer edge portion 294. The central wall 292 has parallel inner and outer side surfaces 296 and 298.

An annular side wall 300 of the threshold cap 290 extends generally axially from the central wall 292. The side wall 200 of the threshold cap 290 has a plurality of openings in the form of slots 302. The slots 302 are spaced apart equally along the side wall 300, in a circular array centered on the axis 50. The slots 302 together form a fluid flow control passage 304 in the threshold cap 290. In the illustrated embodiment, the threshold cap 290 has six slots 302. A greater or lesser number of slots 302 may be provided to obtain the desired flow control characteristics of the inflator 10.

The inner side surface 296 of the central wall 292 of the threshold cap 290 is in abutting engagement with the end wall 234 of the spring cap 230. The outer side surface 298 of the central wall 292 of the threshold cap 290 is in abutting engagement with the inner side surface 46 of the central wall 32 of the diffuser 30.

The threshold cap 290 extends across the entire primary combustion chamber 200 of the inflator 10. The side wall 300 of the threshold cap 290 is in abutting engagement with the inner side surface 76 of the side wall 74 of the combustion cup 70, near the fluid passage 90. The heat sink retainer 280 is disposed in abutting engagement between the threshold cap 290 and the heat sink 270. The heat sink 270 is disposed in abutting engagement between the heat sink retainer 280 and the primary propellant 240. The heat sink 270 is resilient and cushions the primary propellant 240.

The igniter housing 100 is trapped or captured axially between the threshold cap 290 and the closure 40. Specifically, the distance between the spring cap 230 and the mounting portion 102 of the igniter housing 100 is selected so that, when the housing parts 30 and 40 are welded together with the igniter housing inside, the end wall 234 of the spring cap resiliently engages the inner side surface 296 of the central wall 292 of the threshold cap 290. The mounting portion 102 of the igniter housing 100 is pressed axially into engagement with the closure 40. The lower end wall 72 of the combustion cup 70 is trapped or captured axially between the flange 110 of the igniter housing 100 and the end wall 62 of the closure 40.

Prior to actuation of the inflator 10, the end surface 80 of the combustion cup side wall 74 seals against the inner side surface 46 of the diffuser end wall 42, so that the fluid passage 90 is closed and has zero flow area. The closed fluid passage 90 blocks fluid flow between the primary combustion chamber 200 and the fluid outlets 52, prior to actuation of the inflator 10. There is no other path for any significant amount of fluid to flow between the primary inflation fluid source 240 and the fluid outlets 52. Upon actuation of the inflator 10, as described below, the fluid passage 90 opens to enable inflation fluid to flow between the inflation fluid source 240 and the fluid outlets 52. The fluid passage 90, when open, has a smaller flow area than the fluid outlets 52 in the diffuser 30.

Prior to actuation of the inflator 10, the control passage 304 in the threshold cap 290 is also in a closed condition. The slots 302 in the threshold cap are substantially, if not completely, covered by the side wall 74 of the combustion cup 70. There is initially no significant gap between the side wall 300 of the threshold cap 290 and the side wall 74 of the combustion cup 70. The threshold cap 290 substantially blocks fluid flow between the primary combustion chamber 200 and the fluid passage 90. Upon actuation of the inflator 10, as described below, the threshold cap 290 moves and deforms to enable inflation fluid to flow through the slots 302.

In the event of a vehicle crash at or above the first predetermined threshold level of crash severity, but below the second predetermined threshold level of crash severity, an electric signal is applied to the terminals 132 of the primary initiator 130. The primary initiator 130 is actuated and ignites the primary ignition material 210. The combustion products of the primary initiator 130 flow through the passages 136 into the primary combustion chamber 200. The force of the combustion products of the ignition material 210 causes the igniter cap 220 to slide axially along the side wall 120 of the igniter housing 100, into engagement with the spring cap 230. The spring cap 230 restrains further movement of the primary igniter cap 220, which continues to block flow of the combustion products out of the primary initiator chamber 128 past the end surface 126 of the primary ignition chamber side wall 120.

The primary ignition material 210 produces combustion products which move the primary igniter cap 220 axially upward in the primary initiator chamber 128. The combustion products flowing into the primary propellant chamber 200 ignite the primary propellant 240. The primary propellant 240 combusts and produces inflation fluid under pressure in the primary propellant chamber 200. The pressure in the primary propellant chamber 200 rises rapidly to a pressure in the range of about 1,000 psi to about 2,000 psi or more.

The outer major side surface 264 of the secondary propellant cap 260 is exposed to the fluid pressure in the primary propellant chamber 200, through the open center of the heat sink retainer 280. This fluid pressure keeps the secondary propellant cap 260 in engagement with the secondary propellant chamber wall 160. As a result, the secondary propellant cap 260 blocks flow of combustion products from the primary propellant chamber 200 (which surrounds the secondary propellant cap) into the secondary propellant chamber 180. This prevents ignition of the secondary propellant 250 when the primary initiator 130 is actuated but the secondary initiator 152 is not actuated.

The material thickness of the housing 20 is selected so that the end walls 42 and 62 deform because of the pressure of inflation fluid in the housing upon actuation of the primary inflation fluid source 240. Specifically, the end wall 42 of the diffuser 30 deforms axially outward (in an upward direction as viewed in FIG. 2), from the condition shown in FIG. 2 to the condition shown in FIG. 5. Simultaneously, the end wall 62 of the closure 40 deforms axially outward in the opposite direction. The amount of deformation or deflection of the end walls 42 and 62 is dependent on the pressure in the housing 20. That is, the higher the pressure in the housing, the more the end walls 42 and 62 deflect outward.

Figure 5:
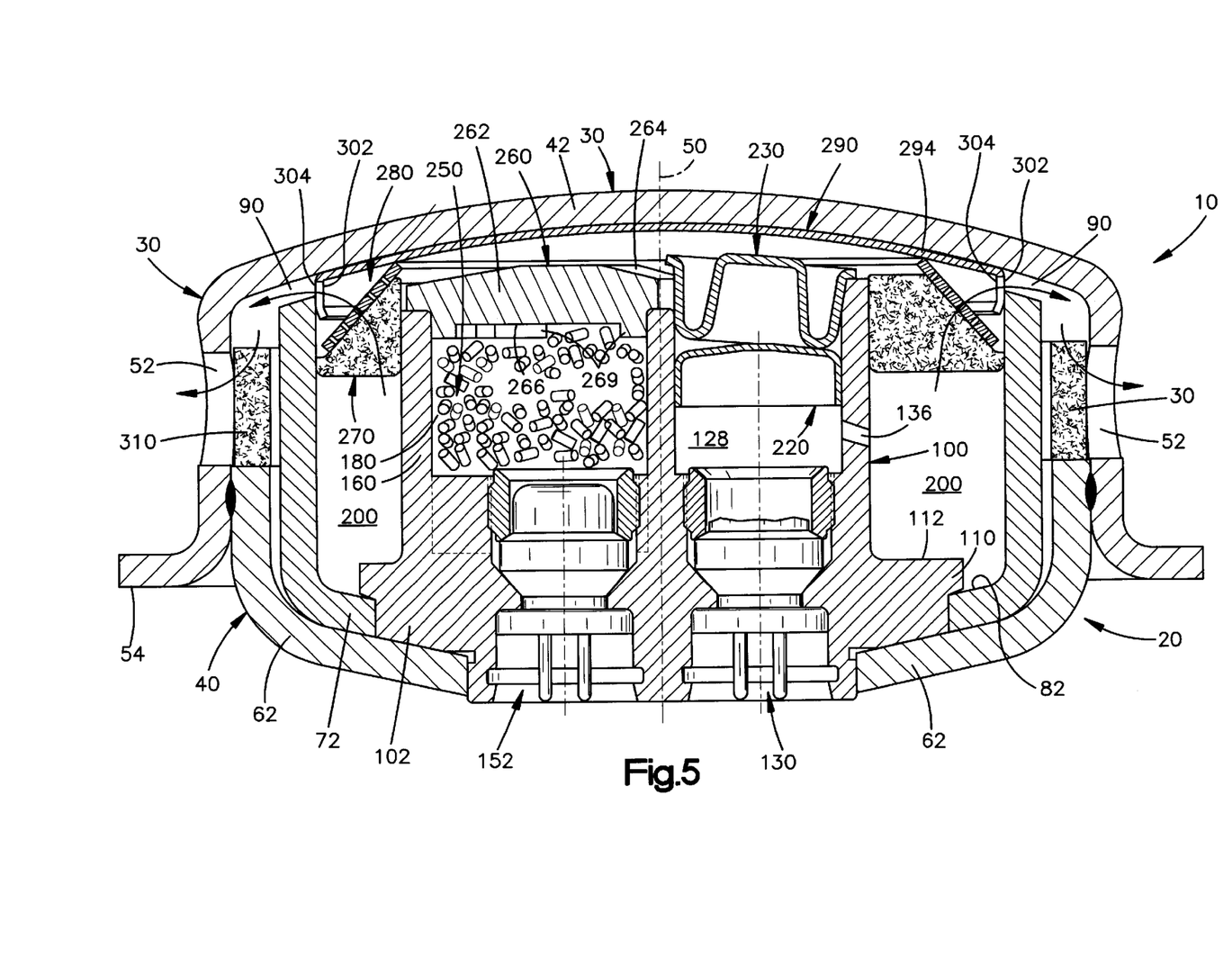
FIG. 5 is a view similar to FIG. 2, showing the inflator in a first actuated condition.

As the diffuser 30 and closure 40 move away from each other, the fluid pressure on the inner side surface 296 of the threshold cap 290 causes the threshold cap to move with the diffuser, away from the closure. At the same time, the heat sink 270 and the heat sink retainer 280 also move with the threshold cap 290 and the diffuser 30, in a direction away from the closure 40. The movement of the threshold cap 290 exposes the slots 302 and opens the control passage 304, as described below, to enable inflation fluid to flow out of the primary propellant chamber 200 through the fluid passage 90.

The pressure of the inflation fluid in the primary propellant chamber 200 forces the mounting portion 102 of the igniter housing 100 against the end wall 62 of the closure 40. The force exerted by the inflation fluid on the flange 110 effects a fluid-tight seal between the igniter housing 100 and the closure 40.

As a result of the deformation of the end walls 42 and 62 of the housing parts 30 and 40, the distance between the end wall of the diffuser and the end wall of the closure increases. When the inflator housing 20 deforms, the combustion cup 70 is no longer trapped axially between the diffuser 30 and the closure 40. The pressure of the inflation fluid in the primary propellant chamber 200, acting in a downward direction (as viewed in FIG. 3) on the lower portion 72 of the combustion cup 70, holds the combustion cup in engagement with the end wall 62 of the closure 40. The combustion cup 70 therefore moves with the end wall 62 of the closure 40, in a direction away from the end wall 42 of the diffuser 30.

The upper end surface 80 of the combustion cup side wall 74 moves away from the inner side surface 46 of the end wall 42 of the diffuser 30. The fluid passage 90 opens and its flow area increases, because of the deformation of the housing 20. The side walls 120 and 160 of the igniter housing 100, the igniter housing mounting portion 102, the combustion cup 70, and the threshold cap 290 cooperate to direct all, or substantially all, of the inflation fluid flowing out of the primary propellant chamber 200 to flow through the fluid passage 90. There is no other path for any significant amount of fluid to flow between the inflation fluid source 246 and the fluid outlets 52.

The heat sink 270 cools and filters the inflation fluid flowing out of the primary propellant chamber 200. The heat sink 270 also filters particulate matter out of the inflation fluid. The heat sink retainer 280 prevents the material of the heat sink 270 from being forced into the slots 302 of the threshold cap 290 by the rapidly flowing inflation fluid.

The inflation fluid flows out of the primary propellant chamber 200, through the slots 302 in the threshold cap 290, and toward the fluid passage 90. Inflation fluid flows through the fluid passage 90, through an annular final filter 310, and toward the inflation fluid outlets 52. The inflation fluid flows out of the primary propellant chamber 200 along the entire 360 degree extent of the fluid passage 90. The fluid outlets 52 direct the inflation fluid to flow out of the housing 20 to the inflatable device 14.

The flow area of the fluid passage 90 in the housing 20 varies in accordance with the pressure of inflation fluid in the housing 20. Specifically, the higher the pressure in the housing 20, the more the end walls 42 and 62 deflect or deform outward. The more the end walls 42 and 62 deflect outward, the more the end surface 80 of the combustion cup 70 moves away from the end wall of the diffuser 30, and the bigger the fluid passage 90 becomes. In one embodiment, the fluid passage 90 is typically about one-half millimeter in axial extent when the inflator 10 is actuated. Under extreme pressure conditions, the fluid passage 90 could have an axial extent of as much as two to three millimeters.

As the housing 20 deforms, the slots 302 in the threshold cap 290 progressively open, increasing the flow area of the control passage 304. At the same time, the fluid passage 90 between the diffuser 30 and the combustion cup 70 progressively opens. Because the fluid passage 90 has a 360 degree circumferential extent and the slots 302 have a limited circumferential extent, the flow area of the fluid passage 90 increases more rapidly than the flow area of the control passage 304. Thus, the fluid flow area through the slots 302 in the threshold cap 290 almost immediately becomes smaller than the fluid flow area through the gap or fluid passage 90 between the combustion cup 70 and the diffuser 30. Thus, the threshold cap 290 acts as a restrictor, or control, for the rate of fluid flow out of the inflator 10.

The flow area of the slots 302 in the threshold cap 290, which make up the control passage 304, varies in accordance with the pressure of inflation fluid in the housing 20. Specifically, the higher the pressure in the housing 20, the more the threshold cap 290 moves away from the closure 40. In addition, the outer edge portion 294 of the central wall 292 of the threshold cap 290 flattens against the end wall 32 of the diffuser 30. As a result, a greater portion of each one of the slots 302 in the threshold cap 290 is exposed, and the control passage 304 becomes bigger.

Because the flow area of the control passage 304 varies in accordance with the pressure of inflation fluid in the housing 20, the internal operating pressure of the inflator 10 is self-regulating. Any increased pressure in the primary propellant chamber 200 causes the control passage 304 to open further, thus allowing the pressure to be relieved and lowered. The range of peak operating pressures in the inflator 10 is, therefore, narrowed, reducing the structural requirements of the inflator housing 20 accordingly.

Controlling fluid flow in this manner, that is, through movement of the slotted threshold cap 290, can be more precise than controlling fluid flow with the gap 90 between the two deforming housing parts 30 and 40. In addition, it is relatively easy to vary the fluid flow characteristics for different inflators, by providing different threshold caps 290 having different opening sizes or configurations.

Because the peak pressures in the primary propellant chamber 200 are reduced by the increased opening of the variable control passage 304, effects of temperature change on the pressure in the primary propellant chamber are minimized. This can enable the use of a primary propellant 240 which is more pressure sensitive, that is, which has a higher burn rate exponent. In addition, with the secondary combustion chamber 180 being completely encircled by the primary combustion chamber 20, it is not necessary that the secondary combustion chamber be capable, itself, of sustaining the structural loads arising upon actuation of the inflator 10.

In the event of a vehicle crash at or above the second predetermined threshold level of crash severity, both the primary initiator 130 and the secondary initiator 152 (FIG. 6) are actuated. The actuation of the primary initiator 130 results in ignition of the primary propellant 240 as described above. Inflation fluid produced by the primary propellant 240 deforms the housing 20, moves the threshold cap 290, and flows out of the inflator 10 as described above.

Figure 6:
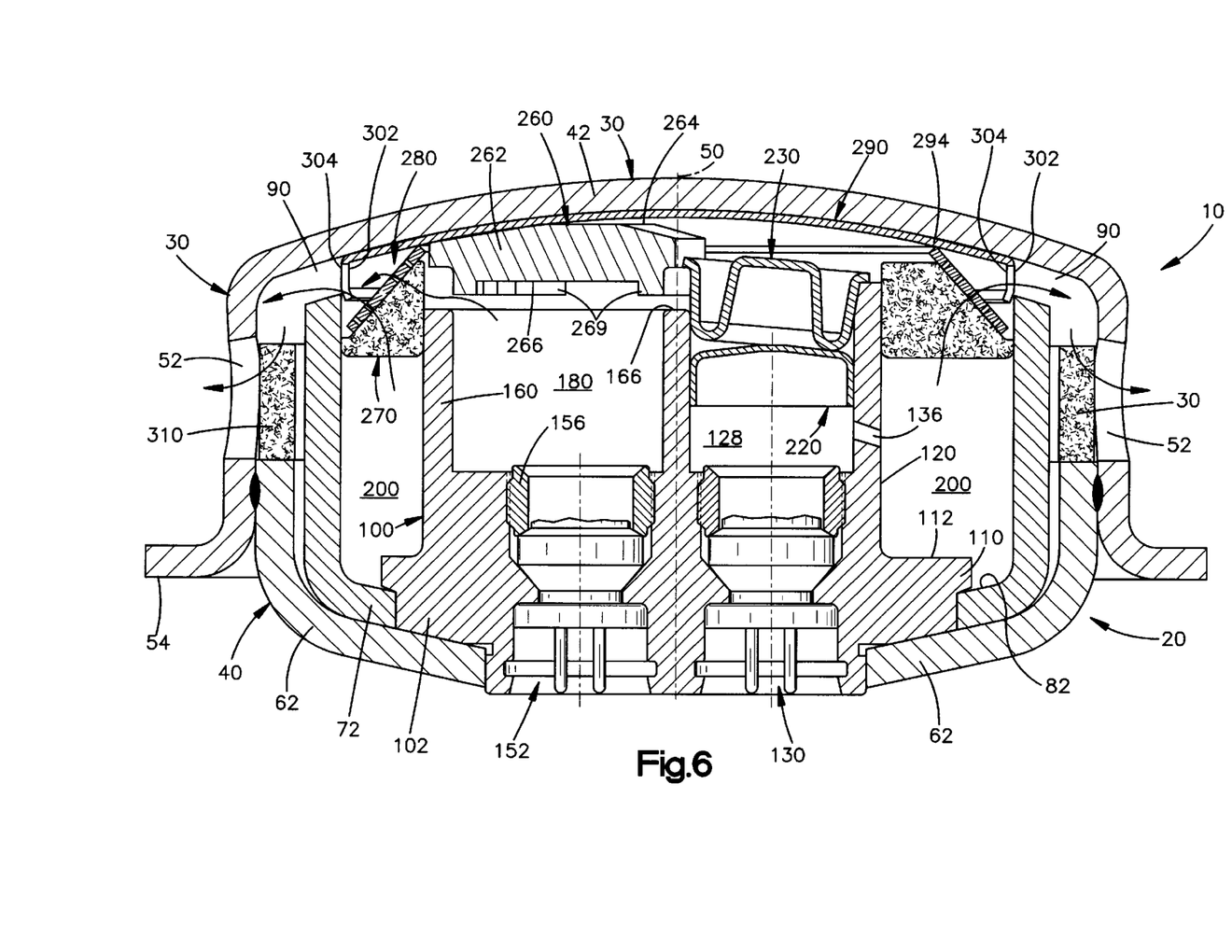
FIG. 6 is a view similar to FIG. 2, showing the inflator in a second actuated condition.
Figure 7:
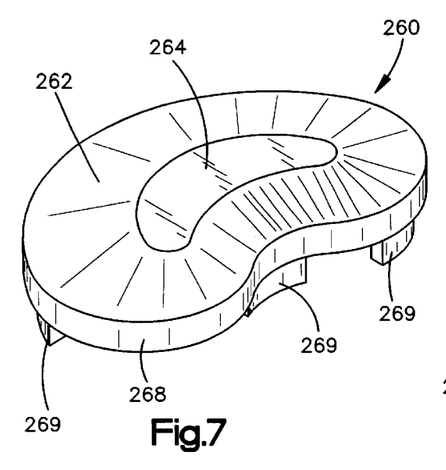
FIG. 7 is a perspective view of a secondary propellant cap which forms a part of the inflator of FIG. 1.
Figure 8:
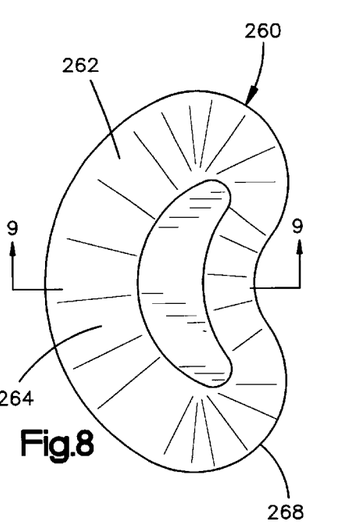
FIG. 8 is a top plan view of the secondary propellant cap of FIG. 7.
Figure 9:
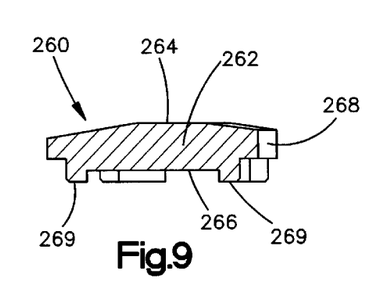
FIG. 9 is a sectional view of the secondary propellant cap of FIG. 7.
Figure 10:
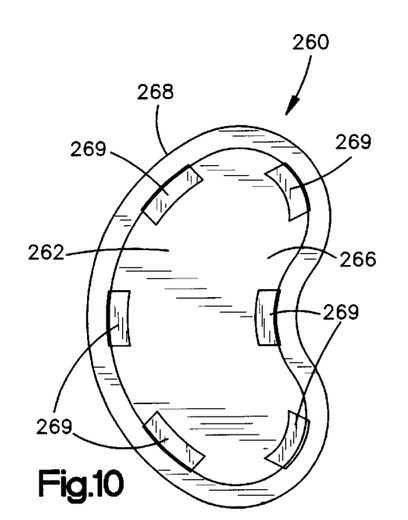
FIG. 10 is a bottom plan view of the secondary propellant cap of FIG. 7.

The secondary initiator 152 is actuated by an electric signal applied to the terminals 154 of the secondary initiator. The secondary initiator 152 ignites the secondary propellant 250. The secondary propellant 250 produces combustion products which increase the pressure in the secondary combustion chamber 180.

The fluid pressure inside the secondary combustion chamber 180 rapidly exceeds the fluid pressure acting on the outer major side surface 264 of the secondary propellant cap 260. As a result, the force of the combustion products of the secondary propellant 250 causes the secondary propellant cap 260 to move out of engagement with the igniter housing 100, as shown in FIG. 6.

The combustion products of the secondary propellant 250 join with the combustion products of the primary propellant 240 and flow into the heat sink 270. The heat sink 270 cools and filters the combustion products of the secondary propellant 250. The inflation fluid flows out of the heat sink 270, through the slots 302 in the threshold cap 290, and thence out of the inflator 10 in the manner described above.

The relatively high pressure in the housing 20, caused by actuation of both propellants 240 and 250, causes the housing 20 to deform more than it does when only the primary propellant 240 is ignited. This increased deformation allows more movement of the threshold cap 290 and thus, if desired, more exposure of the slots 302.

From the above description of the invention, those skilled in the art will perceive improvements, changes and modifications in the invention. Such improvements, changes and modifications within the skill of the art are intended to be covered by the appended claims.

Having described the invention, we claim:

1. An inflator for providing inflation fluid for inflating an inflatable vehicle occupant protection device, said inflator comprising:

a housing;

a primary propellant in a primary chamber in said housing and ignitable to provide inflation fluid to inflate the inflatable device;

a secondary propellant in a secondary chamber in said housing and ignitable to provide inflation fluid to inflate the inflatable device;

initiator means for selectively igniting either said primary propellant alone or both of said primary and secondary propellants; and a secondary propellant cap having a generally kidney-shaped configuration for closing said secondary chamber and for maintaining said secondary propellant in said secondary chamber;

said secondary propellant cap having a first position blocking flow of combustion products of said primary propellant into said secondary chamber when only said primary propellant is ignited;

said secondary propellant cap being movable by combustion products of said secondary propellant when ignited from the first position to a second position enabling flow of inflation fluid out of said secondary chamber to inflate the inflatable device.

2. An inflator as set forth in claim 1, wherein said secondary propellant cap when in the first position is pressed into an opening in a housing portion of said inflator and upon ignition of said secondary propellant pops free of the housing portion.

3. An inflator for providing inflation fluid for inflating an inflatable vehicle occupant protection device, said inflator comprising:

a housing;

a primary propellant in a primary chamber in said housing and ignitable to provide inflation fluid to inflate the inflatable device;

a secondary propellant in a secondary chamber in said housing and ignitable to provide inflation fluid to inflate the inflatable device;

a housing portion at least partially defining said primary chamber and said secondary chamber;

initiator means for selectively igniting either said primary propellant alone or both of said primary and secondary propellants; and a secondary propellant cap for closing said secondary chamber and for maintaining said secondary propellant in said secondary chamber;

said secondary propellant cap being movable from a first position to a second position by combustion products of said secondary propellant, when said secondary propellant is ignited;

said secondary propellant cap, in the first position, being pressed into an opening in said housing portion and blocking flow of combustion products of said primary propellant into said secondary chamber when only said primary propellant is ignited;

said secondary propellant cap, in the second position, being completely separated from said housing portion and enabling flow of inflation fluid out of said secondary chamber through said opening in said housing portion to inflate the inflatable device.

4. An inflator as set forth in claim 3 wherein said housing has a fluid passage for directing flow of inflation fluid out of said housing to the inflatable device, said housing deforming due to the pressure of inflation fluid in said housing upon actuation of one or both of said primary and secondary propellants, the flow area of said fluid passage increasing due to deformation of said housing and varying in accordance with the pressure of inflation fluid in said housing.

5. An inflator as set forth in claim 4 further comprising a flow control member for defining a control passage located between said primary propellant and said fluid passage, the flow area of said control passage varying in accordance with the pressure of inflation fluid in said housing upon actuation of one or both of said primary and secondary propellants.

6. An inflator as set forth in claim 4 wherein said housing portion is a one-piece igniter housing.

7. An inflator as set forth in claim 3 wherein said secondary propellant cap has a generally kidney-shaped configuration.

8. An inflator as set forth in claim 3 wherein said secondary propellant chamber is encircled by said primary propellant chamber.

9. An inflator as set forth in claim 3 wherein said initiator means comprises a primary initiator and a primary ignition material for igniting said primary propellant, and wherein said initiator means comprises only a secondary initiator for igniting said secondary propellant.

10. An inflator as set forth in claim 3 wherein said secondary propellant cap has first and second opposite major side surfaces, said first major side surface being exposed to said secondary propellant in said secondary chamber, said second major side surface being exposed to the fluid pressure of said primary chamber.

11. An apparatus for providing inflation fluid for inflating an inflatable vehicle occupant protection device, the apparatus comprising:

a housing having a plurality of exit openings for enabling flow of inflation fluid out of the inflator;

primary and secondary combustion chambers located within the housing, a first inflation fluid source located in the primary combustion chamber and actuatable to effect flow of inflation fluid through the plurality of exit openings, a second inflation fluid source located in the secondary combustion chamber and actuatable to effect flow of inflation fluid through the primary combustion chamber and through the plurality of exit openings, the secondary combustion chamber including an open top which enables inflation fluid resulting from actuation of the second inflation fluid source to exit the second combustion chamber;

the first inflation fluid source and the second inflation fluid source comprising solid pyrotechnic material which, when ignited, generates inflation fluid;

a first initiator associated with the primary combustion chamber for, when energized, actuating the first inflation fluid source;

a second initiator associated with the secondary combustion chamber for, when energized, actuating the second inflation fluid source;

a cap closing the open top of the secondary combustion chamber, the cap preventing inflation fluid resulting from actuation of only the first inflation fluid source from entering the secondary combustion chamber, inflation fluid resulting from actuation of the second inflation fluid source removing the cap from at least a portion of the open top of the secondary combustion chamber to form a passage for enabling inflation fluid resulting from actuation of the second inflation fluid source to exit the secondary combustion chamber, the passage extending from the secondary combustion chamber to the primary combustion chamber, a gap that is formed between opposing surface portions of the secondary combustion chamber and the cap when the cap is removed from at least a portion of the open top of the secondary combustion chamber defining the passage in its entirety and inflation fluid exiting the secondary combustion chamber flowing through only the gap; and a flow control member that extends over the secondary combustion chamber and at least a portion of the primary combustion chamber for controlling flow of inflation fluid toward the exit openings, the cap contacting the flow control member when the cap is lifted from the open top of the secondary combustion chamber.

12. An apparatus for providing inflation fluid for inflating an inflatable vehicle occupant protection device, the apparatus comprising:

a housing having a plurality of exit openings for enabling flow of inflation fluid out of the inflator;

primary and secondary combustion chambers located within the housing, a first inflation fluid source located in the primary combustion chamber and actuatable to effect flow of inflation fluid through the plurality of exit openings, a second inflation fluid source located in the secondary combustion chamber and actuatable to effect flow of inflation fluid through the primary combustion chamber and through the plurality of exit openings, the secondary combustion chamber including an open top which enables inflation fluid resulting from actuation of the second inflation fluid source to exit the second combustion chamber;

the first inflation fluid source and the second inflation fluid source comprising solid pyrotechnic material which, when ignited, generates inflation fluid;

a first initiator associated with the primary combustion chamber for, when energized, actuating the first inflation fluid source;

a second initiator associated with the secondary combustion chamber for, when energized, actuating the second inflation fluid source;

a cap closing the open top of the secondary combustion chamber, the cap preventing inflation fluid resulting from actuation of only the first inflation fluid source from entering the secondary combustion chamber, inflation fluid resulting from actuation of the second inflation fluid source removing the cap from at least a portion of the open top of the secondary combustion chamber to form a passage for enabling inflation fluid resulting from actuation of the second inflation fluid source to exit the secondary combustion chamber, the passage extending from the secondary combustion chamber to the primary combustion chamber, a gap that is formed between opposing surface portions of the secondary combustion chamber and the cap when the cap is removed from at least a portion of the open top of the secondary combustion chamber defining the passage in its entirety and inflation fluid exiting the secondary combustion chamber flowing through only the gap;

an annular filter that encircles the secondary combustion chamber and filters inflation fluid resulting from actuation of the first and second inflation fluid sources; and a flow control member that extends over the secondary combustion chamber and at least a portion of the filter, the flow control member helping to position the filter between the secondary combustion chamber and the exit openings and directing inflation fluid resulting from actuation of at least the second inflation fluid source toward the filter.

13. An inflator for providing inflation fluid for inflating an inflatable vehicle occupant protection device, the inflator comprising:

a housing;

primary and secondary propellant chambers located within the housing, the secondary propellant chamber including a side wall and an open top;

a primary propellant in the primary propellant chamber being ignitable to provide inflation fluid to inflate the inflatable device;

a secondary propellant in the secondary propellant chamber being ignitable to provide inflation fluid to inflate the inflatable device;

first initiator means for igniting the primary propellant and secondary initiator means for igniting the secondary propellant;

a cap for covering the open top of the secondary propellant chamber and preventing flow of inflation fluid resulting from ignition of the primary propellant into the secondary propellant chamber when only the primary propellant is ignited, the cap including a surface which is in engagement with the side wall of the secondary propellant chamber when the cap is covering the open top of the secondary propellant chamber, inflation fluid resulting from ignition of the secondary propellant moving the surface of the cap away from and out of engagement with at least a portion of the side wall of the secondary propellant chamber so as to remove the cap from covering at least part of the open top of the secondary propellant chamber and creating a flow passage for enabling flow of inflation fluid out of the secondary propellant chamber, inflation fluid flowing out of the secondary propellant chamber flowing through only the flow passage created during removal of the cap; and a flow control member that extends over the secondary propellant chamber and at least a portion of the primary propellant chamber for controlling flow of inflation fluid within the housing, the cap contacting the flow control member when the cap is dislodged from the side wall of the secondary propellant chamber.

14. An inflator for providing inflation fluid for inflating an inflatable vehicle occupant protection device, the inflator comprising:

a housing;

primary and secondary propellant chambers located within the housing, the secondary propellant chamber including a side wall and an open top;

a primary propellant in the primary propellant chamber being ignitable to provide inflation fluid to inflate the inflatable device;

a secondary propellant in the secondary propellant chamber being ignitable to provide inflation fluid to inflate the inflatable device;

first initiator means for igniting the primary propellant and secondary initiator means for igniting the secondary propellant;

a cap for covering the open top of the secondary propellant chamber and preventing flow of inflation fluid resulting from ignition of the primary propellant into the secondary propellant chamber when only the primary propellant is ignited, the cap including a surface which is in engagement with the side wall of the secondary propellant chamber when the cap is covering the open top of the secondary propellant chamber, inflation fluid resulting from ignition of the secondary propellant moving the surface of the cap away from and out of engagement with at least a portion of the side wall of the secondary propellant chamber so as to remove the cap from covering at least part of the open top of the secondary propellant chamber and creating a flow passage for enabling flow of inflation fluid out of the secondary propellant chamber, inflation fluid flowing out of the secondary propellant chamber flowing through only the flow passage created during removal of the cap;

an annular filter that encircles the secondary propellant chamber and filters inflation fluid resulting from actuation of the first and second propellants; and a flow control member that extends over the secondary propellant chamber and at least a portion of the filter, the flow control member helping to position the filter within the housing and directing inflation fluid resulting from actuation of the first and second propellants toward the filter.

15. An apparatus for providing inflation fluid for inflating an inflatable vehicle occupant protection device, the apparatus comprising:

a housing having a plurality of exit openings for enabling flow of inflation fluid out of the inflator;

primary and secondary combustion chambers located within the housing, a first inflation fluid source located in the primary combustion chamber and actuatable to effect flow of inflation fluid through the plurality of exit openings, a second inflation fluid source located in the secondary combustion chamber and actuatable to effect flow of inflation fluid through the primary combustion chamber and through the plurality of exit openings, the secondary combustion chamber including an open top which enables inflation fluid resulting from actuation of the second inflation fluid source to exit the second combustion chamber, a perimeter of the secondary combustion chamber being defined by an interior surface;

the first inflation fluid source and the second inflation fluid source comprising solid pyrotechnic material which, when ignited, generates inflation fluid;

a first initiator associated with the primary combustion chamber for, when energized, actuating the first inflation fluid source;

a second initiator associated with the secondary combustion chamber for, when energized, actuating the second inflation fluid source; and a cap including structure for engaging the interior surface of the secondary combustion chamber to secure the cap in a first condition closing the open top of the secondary combustion chamber, the cap, when in the first condition, preventing inflation fluid resulting from actuation of only the first inflation fluid source from entering the secondary combustion chamber, inflation fluid resulting from actuation of the second inflation fluid source moving the cap from the first condition closing the open top of the secondary combustion chamber to a second condition in which the cap is completely separated from at least a portion of the perimeter of the secondary combustion chamber so as to form a gap having opposite boundaries defined by the cap and the portion of the perimeter of the secondary combustion chamber from which the cap is completely separated, inflation fluid resulting from actuation of the second inflation fluid source flowing through only the gap as the inflation fluid flows to the primary combustion chamber.

16. The apparatus as set forth in claim 15 wherein the secondary combustion chamber includes a side wall, the side wall including the interior surface and an upper end of the interior surface of the side wall defining the open top of the secondary combustion chamber, the structure of the cap, when in the first condition closing the open top of the secondary combustion chamber, being in abutting engagement with and sealing against the interior surface of the side wall.

17. The apparatus as set forth in claim 16 wherein the cap is press fit against the interior surface of the side wall of the secondary combustion chamber so that the inflation fluid within the secondary combustion chamber must reach a predetermined pressure to dislodge the cap from the side wall.

18. The apparatus as set forth in claim 15 further including an annular filter that encircles the secondary combustion chamber and filters inflation fluid resulting from actuation of the first and second inflation fluid sources.

19. An apparatus for providing inflation fluid for inflating an inflatable vehicle occupant protection device, the apparatus comprising:

a housing having a plurality of exit openings for enabling flow of inflation fluid out of the inflator;

primary and secondary combustion chambers located within the housing, a first inflation fluid source located in the primary combustion chamber and actuatable to effect flow of inflation fluid through the plurality of exit openings, a second inflation fluid source located in the secondary combustion chamber and actuatable to effect flow of inflation fluid through the primary combustion chamber and through the plurality of exit openings, the secondary combustion chamber being defined by a wall that defines an open top of the second combustion chamber;

the first inflation fluid source and the second inflation fluid source comprising solid pyrotechnic material which, when ignited, generates inflation fluid;

a first initiator associated with the primary combustion chamber for, when energized, actuating the first inflation fluid source;

a second initiator associated with the secondary combustion chamber for, when energized, actuating the second inflation fluid source; and a cap associated with the secondary combustion chamber, the cap being a structure which has no holes that extend through the structure for conducting inflation fluid through the cap, the cap having a first position in which the cap is located on the wall of the secondary combustion chamber preventing inflation fluid resulting from actuation of only the first inflation fluid source from entering the secondary combustion chamber, inflation fluid resulting from actuation of the second inflation fluid source moving the cap from the first position to a second position, at least a portion of the cap being spaced away from the wall of the secondary combustion chamber when the cap is in the second position so as to enable inflation fluid flow from the secondary combustion chamber to the primary combustion chamber, a gap being defined between the portion of the cap that is spaced away from the wall and the wall of the secondary combustion chamber, inflation fluid resulting from actuation of the second inflation fluid source flowing through only the gap prior to entering the primary combustion chamber.

20. The apparatus as set forth in claim 19 wherein the cap is press fit against the wall of the secondary combustion chamber so that the inflation fluid resulting in actuation of the second inflation fluid source must reach a predetermined pressure to dislodge the cap from the wall.

21. The apparatus as set forth in claim 19 further including an annular filter that encircles the secondary combustion chamber and filters inflation fluid resulting from actuation of the first and second inflation fluid sources.

* * * * *